(12) United States Patent
Harvey et al.

(10) Patent No.: US 8,905,357 B1
(45) Date of Patent: Dec. 9, 2014

(54) THIN MEMBRANE STRUCTURE

(75) Inventors: Thomas Jeffrey Harvey, Nederland, CO (US); Shane Eric Stamm, Boulder, CO (US)

(73) Assignee: MMA Design, LLC, Boulder, CO (US)

( * ) Notice: Subject to any disclaimer, the term of this patent is extended or adjusted under 35 U.S.C. 154(b) by 1139 days.

(21) Appl. No.: 12/924,586

(22) Filed: Sep. 30, 2010

Related U.S. Application Data

(60) Provisional application No. 61/248,392, filed on Oct. 2, 2009.

(51) Int. Cl.
*B64G 1/22* (2006.01)
*B64G 1/36* (2006.01)

(52) U.S. Cl.
USPC ............... 244/172.6; 244/168; 244/171.7

(58) Field of Classification Search
USPC ............. 244/172.6, 168, 172.8, 171, 172.77, 244/171.7, 172.7
See application file for complete search history.

(56) References Cited

U.S. PATENT DOCUMENTS

| | | | | |
|---|---|---|---|---|
| 3,493,765 A * | 2/1970 | Horn et al. | ................. | 250/206.2 |
| 3,530,469 A * | 9/1970 | Morgan et al. | .................. | 342/10 |
| 3,735,942 A * | 5/1973 | Palz | ............................ | 244/172.7 |
| 3,735,943 A * | 5/1973 | Fayet | .......................... | 244/172.7 |
| 4,380,013 A * | 4/1983 | Slysh | ............................. | 343/753 |
| 4,426,052 A * | 1/1984 | Hubert et al. | ................. | 244/168 |
| 4,614,319 A * | 9/1986 | Drexler | ...................... | 244/171.5 |
| 4,854,526 A * | 8/1989 | Rochefort | .................. | 244/158.1 |
| 5,052,640 A * | 10/1991 | Chang | ........................ | 244/172.7 |
| 5,108,047 A * | 4/1992 | Puech | .......................... | 244/113 |
| 5,196,857 A * | 3/1993 | Chiappetta et al. | ........... | 343/881 |
| 5,386,953 A * | 2/1995 | Stuart | ........................ | 244/158.4 |
| 5,518,209 A * | 5/1996 | Chicoine et al. | ........... | 244/159.4 |
| 5,527,001 A * | 6/1996 | Stuart | ........................ | 244/159.4 |
| 5,697,582 A * | 12/1997 | Suraueret al. | ................ | 244/168 |
| 5,755,406 A * | 5/1998 | Aston et al. | ................ | 244/159.4 |
| 5,857,648 A * | 1/1999 | Dailey et al. | ................ | 244/172.6 |
| 6,016,999 A * | 1/2000 | Simpson et al. | ........... | 244/159.5 |
| 6,194,790 B1 * | 2/2001 | Griffin et al. | ................. | 290/1 R |
| 6,478,261 B2 * | 11/2002 | Laraway et al. | ........... | 244/172.6 |
| 6,568,640 B1 * | 5/2003 | Barnett | ...................... | 244/158.3 |
| 6,585,193 B1 * | 7/2003 | Kustas et al. | ................. | 244/169 |
| 6,689,952 B2 * | 2/2004 | Kawaguchi | ...................... | 290/50 |
| 7,714,797 B2 * | 5/2010 | Couchman et al. | ........... | 343/881 |
| 8,308,111 B2 * | 11/2012 | Lu et al. | ..................... | 244/172.7 |
| 8,485,475 B2 * | 7/2013 | Allen et al. | ................. | 244/158.2 |
| 2002/0074458 A1 * | 6/2002 | Laraway et al. | .............. | 244/173 |
| 2003/0010869 A1 * | 1/2003 | Kawaguchi | ................... | 244/168 |
| 2003/0010870 A1 * | 1/2003 | Chafer | .......................... | 244/172 |
| 2005/0230558 A1 * | 10/2005 | Nakasuka | .................. | 244/159.5 |
| 2011/0023484 A1 * | 2/2011 | Lu et al. | ..................... | 60/641.15 |
| 2011/0242663 A1 * | 10/2011 | Daily et al. | ................... | 359/601 |

* cited by examiner

*Primary Examiner* — Tien Dinh
*Assistant Examiner* — Steven Hawk
(74) *Attorney, Agent, or Firm* — Christopher J. Kulish

(57) ABSTRACT

A thin membrane structure for stabilizing a spacecraft is provided. The spacecraft has a first end and a second end. The spacecraft has a center of pressure and a center of gravity. The thin membrane structure comprises a module secured to the spacecraft and a structure having a polygonal base and a plurality of triangular side panels meeting in a point opposite the base with the point secured to the module. Prior to deployment, the structure is entirely contained within the module. Subsequent to deployment, the structure expands to a pyramidal shape with the distance between the center of pressure and the center of gravity increasing to a length greater than approximately one-half the length of the spacecraft.

16 Claims, 12 Drawing Sheets

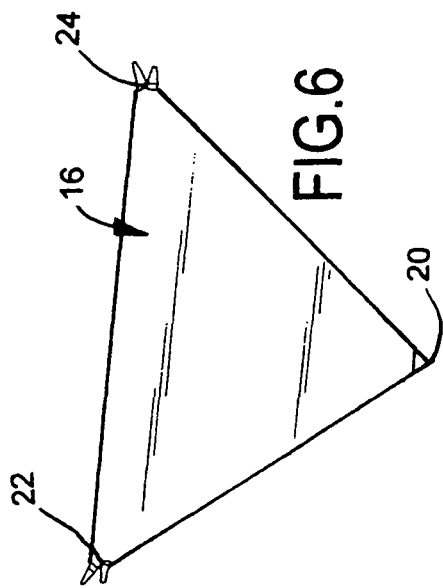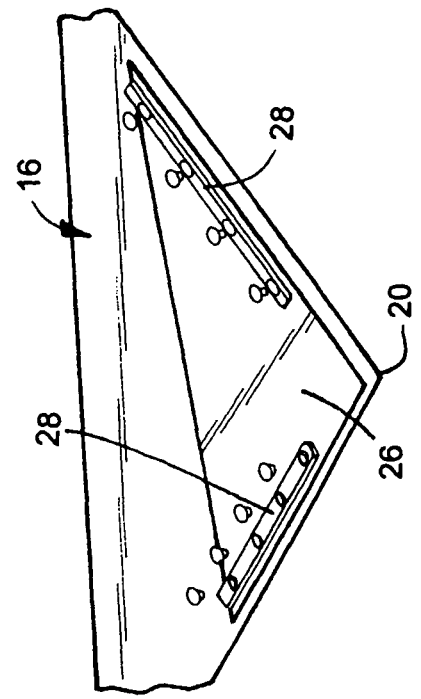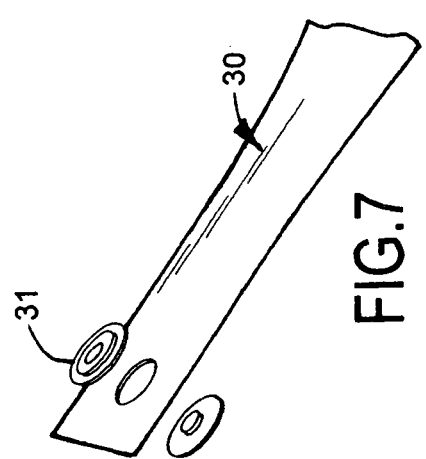

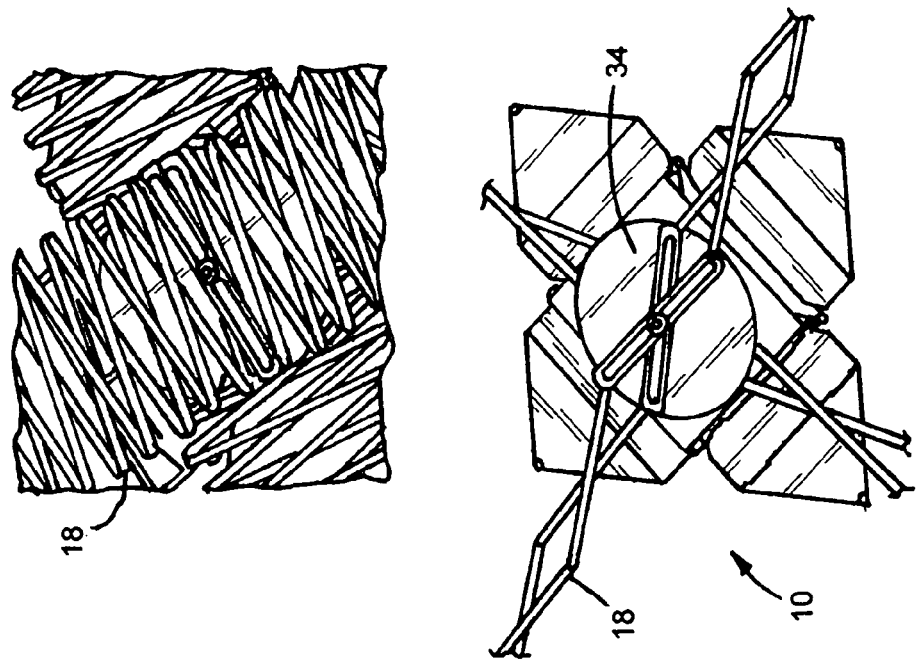
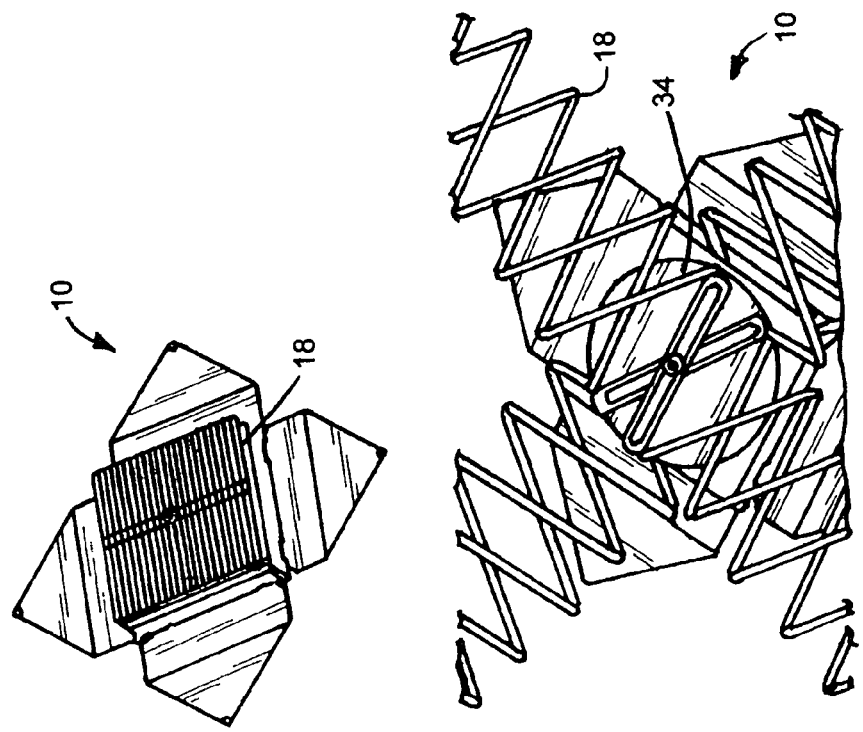
FIG. 16

THIN MEMBRANE STRUCTURE

The present application claims benefit of priority of provisional patent application Ser. No. 61/248,392, filed on Oct. 2, 2009, entitled "Thin membrane Structure That, Once Deployed, Helps Increase Spacecraft Stability".

This invention was made with support from the U.S. Government under contract FA9453-10-C-0033 awarded by the U.S. Air Force Research Laboratory. The U.S. Government has certain rights in the invention.

BACKGROUND OF THE INVENTION

1. Field of the Invention

This invention relates generally to a thin membrane structure and, more particularly, the invention relates to a thin membrane structure that, when deployed, increases the distance between the center of gravity and center of pressure thereby increasing spacecraft stability.

2. Description of the Prior Art

Ultra-light weight, large spacecraft structures can be used for a variety of purposes including solar sails, heat shields, communication devices, power generation devices, and the like. The structures must be compatible for deployment, self-deployable, and upon deployment, sufficiently rigid and stable and unfolding to a shape exactly the same as it was before it was folded compactly for deployment in space.

As mentioned, the spacecraft structures can be solar sails propelled by solar pressure can be used for propelling vehicles in space. A requirement for producing such solar sails is that the sail be in the form of a thin membrane that can be fabricated into membranes of a desired area, yet which are strong and lightweight, and capable of long endurance in the space environment. Such membranes or sails should also be constructed so that means for imparting some stiffness to the sail can be applied thereto to facilitate erecting the sail in the space environment.

Accordingly, there exists a need for a thin membrane structure that can be used for multiple purposes including, but not limited to, de-orbit, solar sail, solar cell, etc. Additionally, a need exists for a thin membrane structure that once deployed increases spacecraft stability. Furthermore, there exists a need for a thin membrane structure that moves the center of gravity from the center of pressure and is deployable with other support structures.

SUMMARY

The present invention is a thin membrane structure for stabilizing a spacecraft. The spacecraft has a first end and a second end. The spacecraft has a center of pressure and a center of gravity. The thin membrane structure comprises a module secured to the spacecraft and a structure having a polygonal base and a plurality of triangular side panels meeting in a point opposite the base with the point secured to the module. Prior to deployment, the structure is entirely contained within the module. Subsequent to deployment, the structure expands to a pyramidal shape with the distance between the center of pressure and the center of gravity increasing to a length greater than approximately one-half the length of the spacecraft.

In addition, the present invention includes a method for stabilizing a spacecraft. The spacecraft has a first end and a second end. The spacecraft has a center of pressure and a center of gravity. The method comprises securing a module to the spacecraft, providing a structure having a polygonal base and a plurality of triangular side panels meeting in a point opposite the base, securing the point to the module, containing the entire structure within the module prior to deployment, expanding the structure to a pyramidal shape subsequent to deployment, and increasing the distance between the center of pressure and the center of gravity to a length greater than approximately one-half the length of the spacecraft.

The present invention further includes a thin membrane structure for stabilizing a spacecraft. The spacecraft has a first end and a second end. The spacecraft has a center of pressure and a center of gravity. The thin membrane structure comprises a module secured to the spacecraft and a structure having a polygonal base and four triangular side panels. Each side panel has a top point, a first base point, and a second base point with the side panels meeting at the top points opposite the base. The top points are secured to the module. A plurality of pantographs extend between each of the side panels with each of the pantographs having an attached end attached to the module and a free end secured to the base points of the side panels. Prior to deployment, the structure and the pantographs are entirely contained within the module. Subsequent to deployment, the structure and pantographs expand to a pyramidal shape with the distance between the center of pressure and the center of gravity increasing to a length greater than approximately one-half the length of the spacecraft.

BRIEF DESCRIPTION OF THE DRAWINGS

FIG. 6 is perspective view illustrating one of the membranes of the thin membrane structure, constructed in accordance with the present invention;

FIG. 7 is a perspective view illustrating a pantograph interface of one of the membranes of the thin membrane structure, constructed in accordance with the present invention;

FIG. 8 is a perspective view illustrating a module interface of one of the membranes of the thin membrane structure, constructed in accordance with the present invention;

FIG. 16 is a series of perspective views illustrating the root pantograph sequencer mechanism as it deploys thin membrane structure, constructed in accordance with the present invention.

DETAILED DESCRIPTION OF THE PREFERRED EMBODIMENTS

Figures 3, 4, 5:
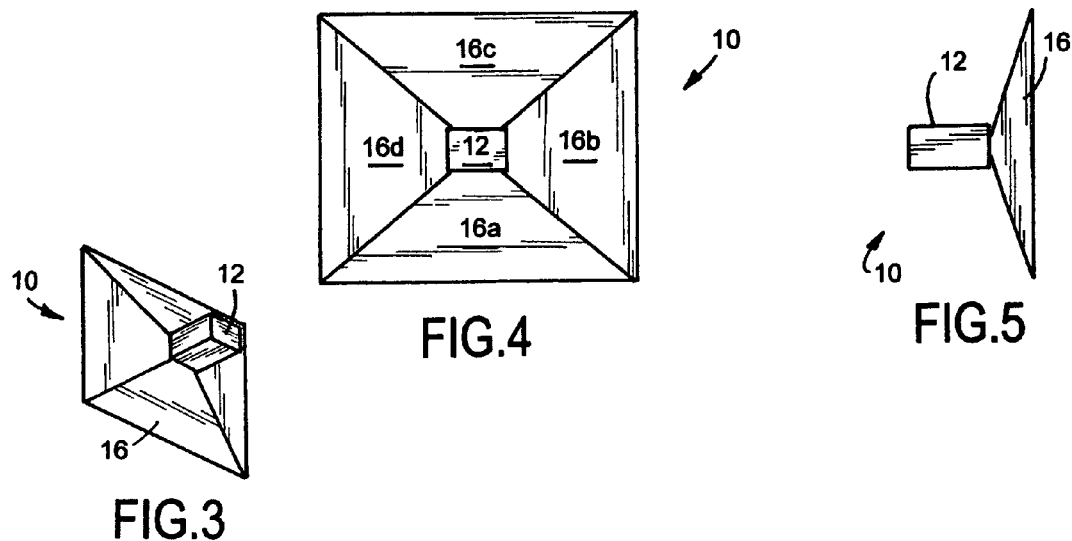
FIG. 3 is a perspective view illustrating the thin membrane structure, constructed in accordance with the present invention, subsequent to deployment.
FIG. 4 is a bottom view illustrating the thin membrane structure, constructed in accordance with the present invention, subsequent to deployment.
FIG. 5 is an elevational side view illustrating the thin membrane structure, constructed in accordance with the present invention, subsequent to deployment.
Figure 1:
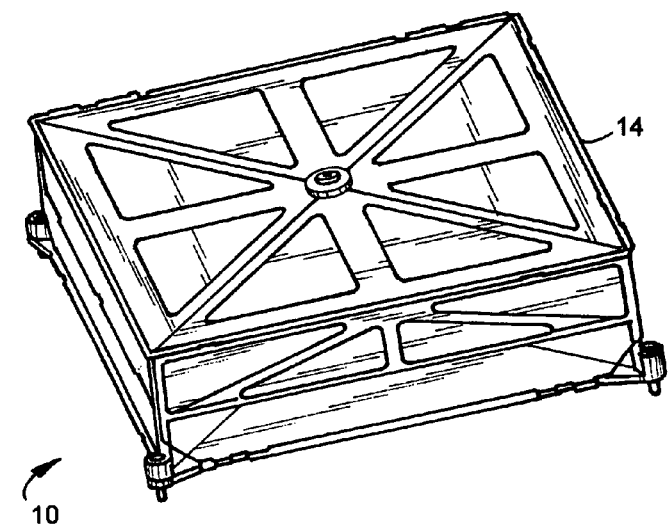
FIG. 1 is a perspective view illustrating a module holding a thin membrane structure, constructed in accordance with the present invention, prior to deployment.
Figure 2:
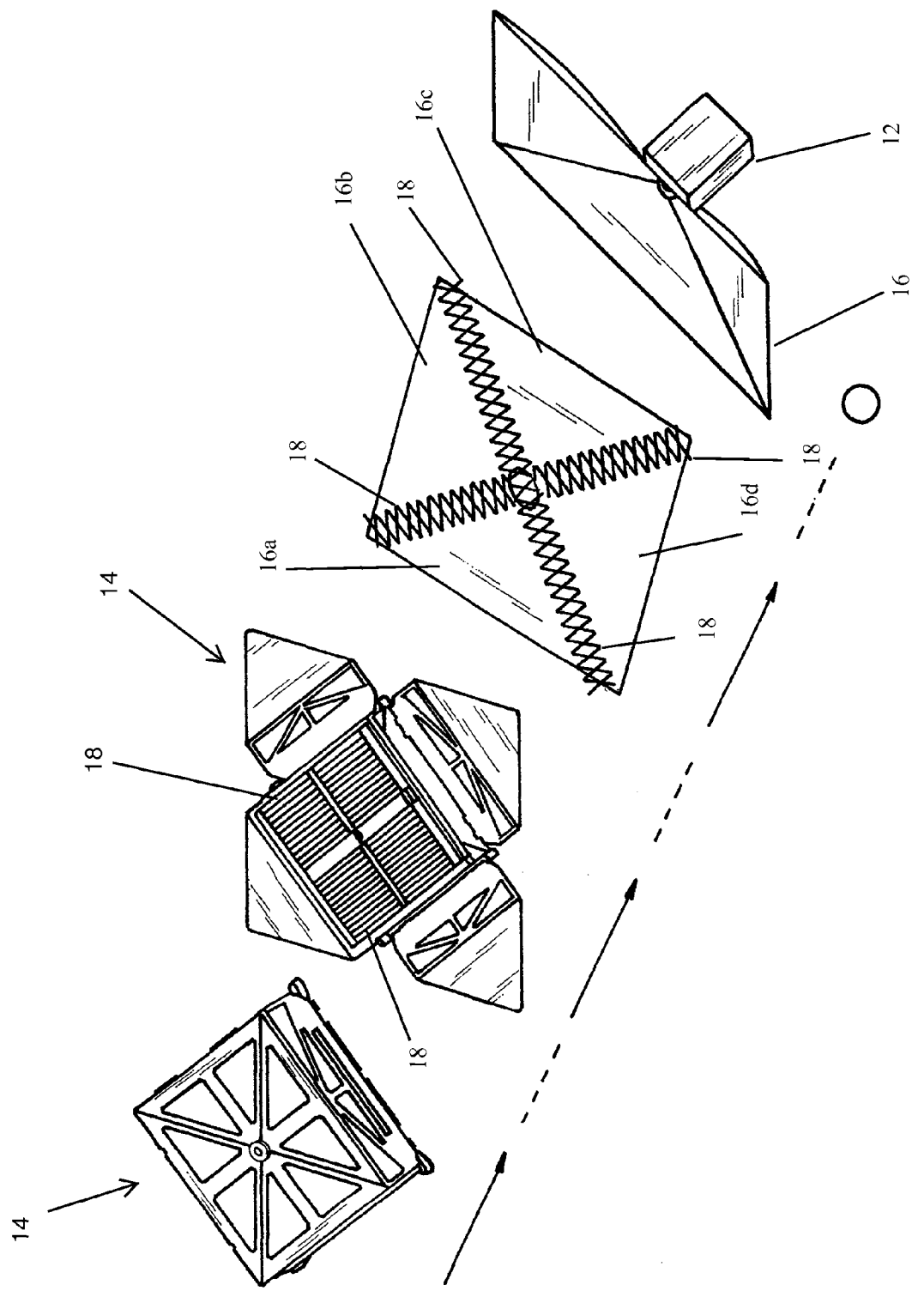
FIG. 2 is a series of perspective views illustrating the deployment sequence for the thin membrane structure, constructed in accordance with the present invention.
Figure 5A:
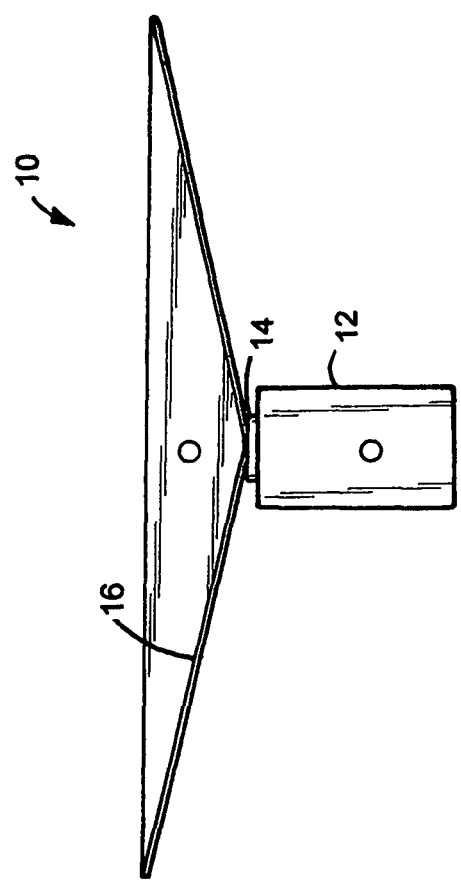
FIG. 5a is a schematic side view illustrating the thin membrane structure, constructed in accordance with the present invention, subsequent to deployment.
Figure 9:
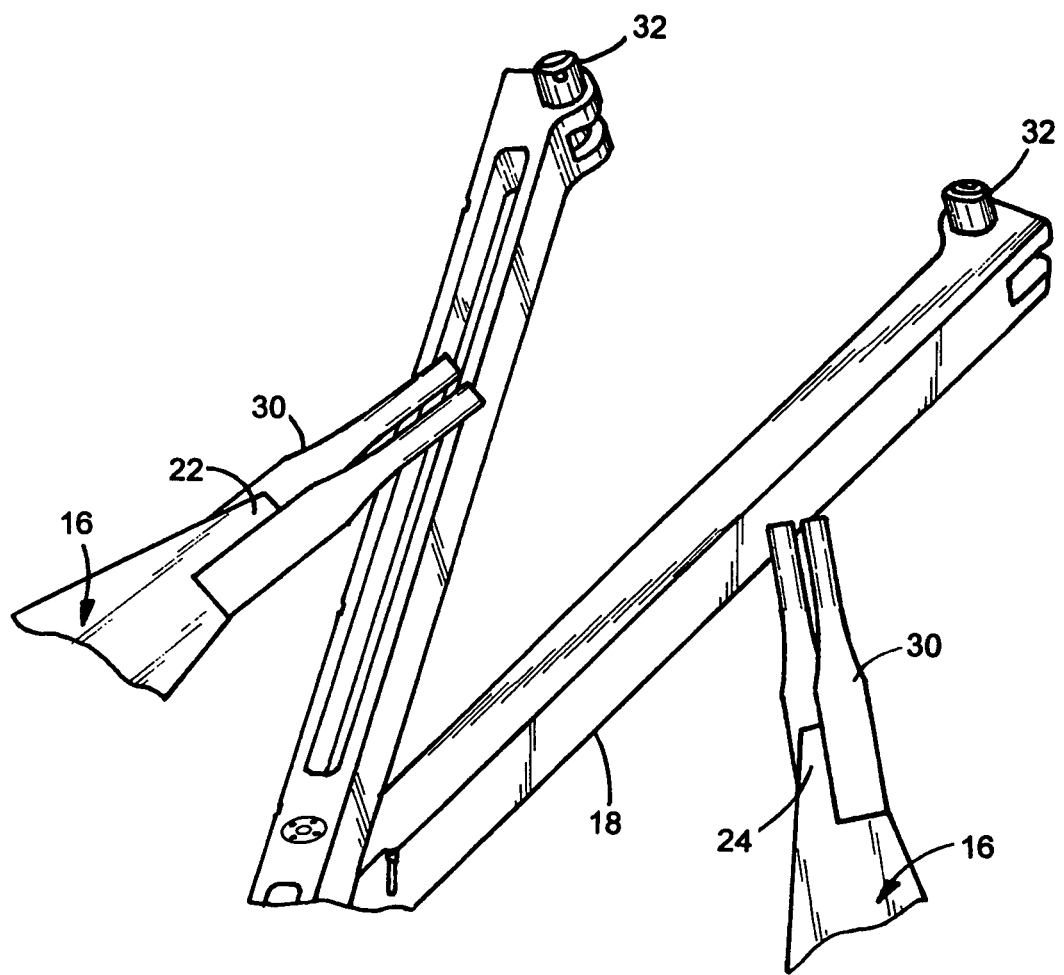
FIG. 9 is a perspective view illustrating the pantograph interface of two adjacent membranes of the thin membrane structure, constructed in accordance with the present invention.
Figure 10:
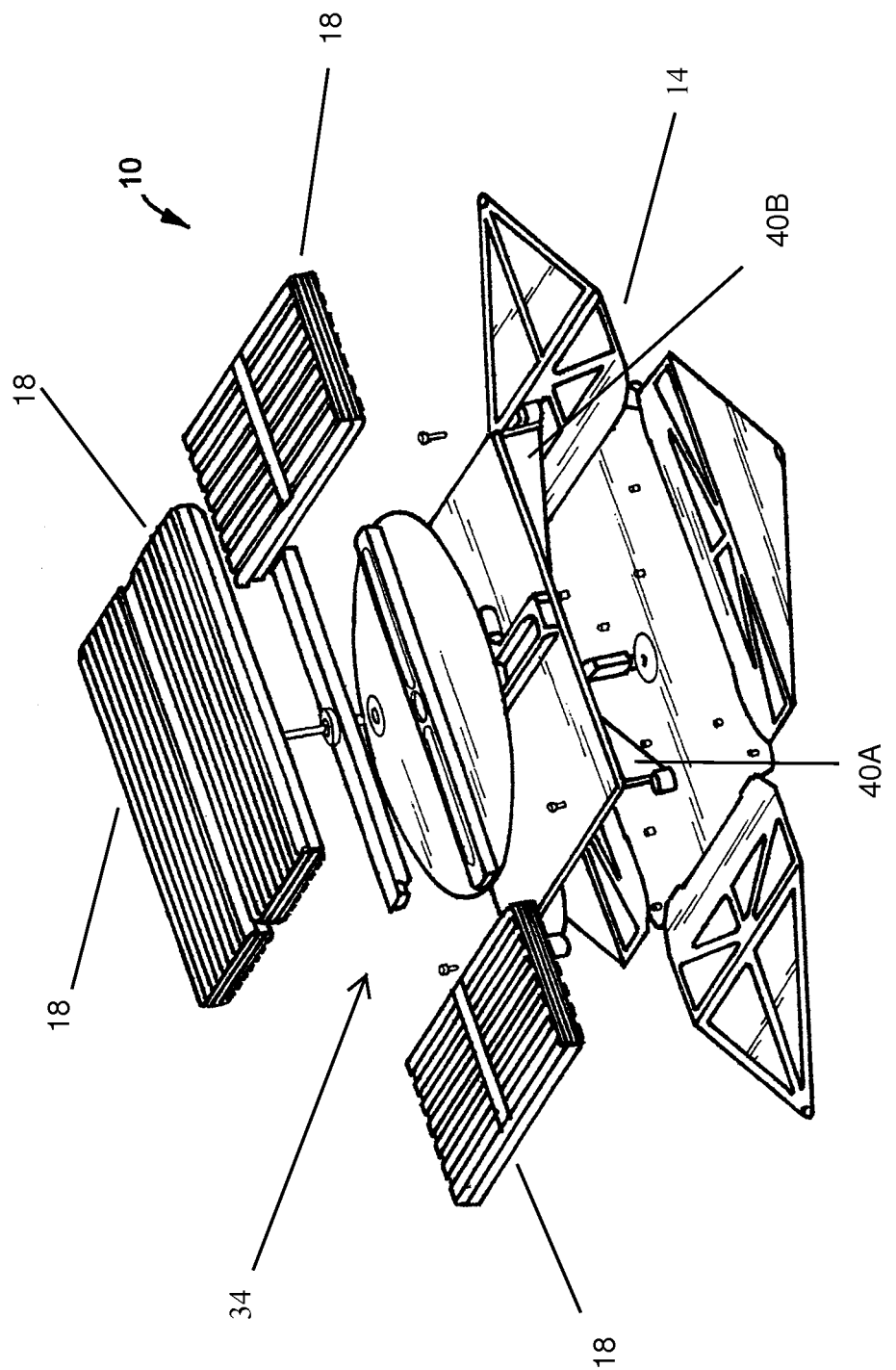
FIG. 10 is an exploded perspective view illustrating the module subassemblies of the module holding the thin membrane structure, constructed in accordance with the present invention.
Figure 11:
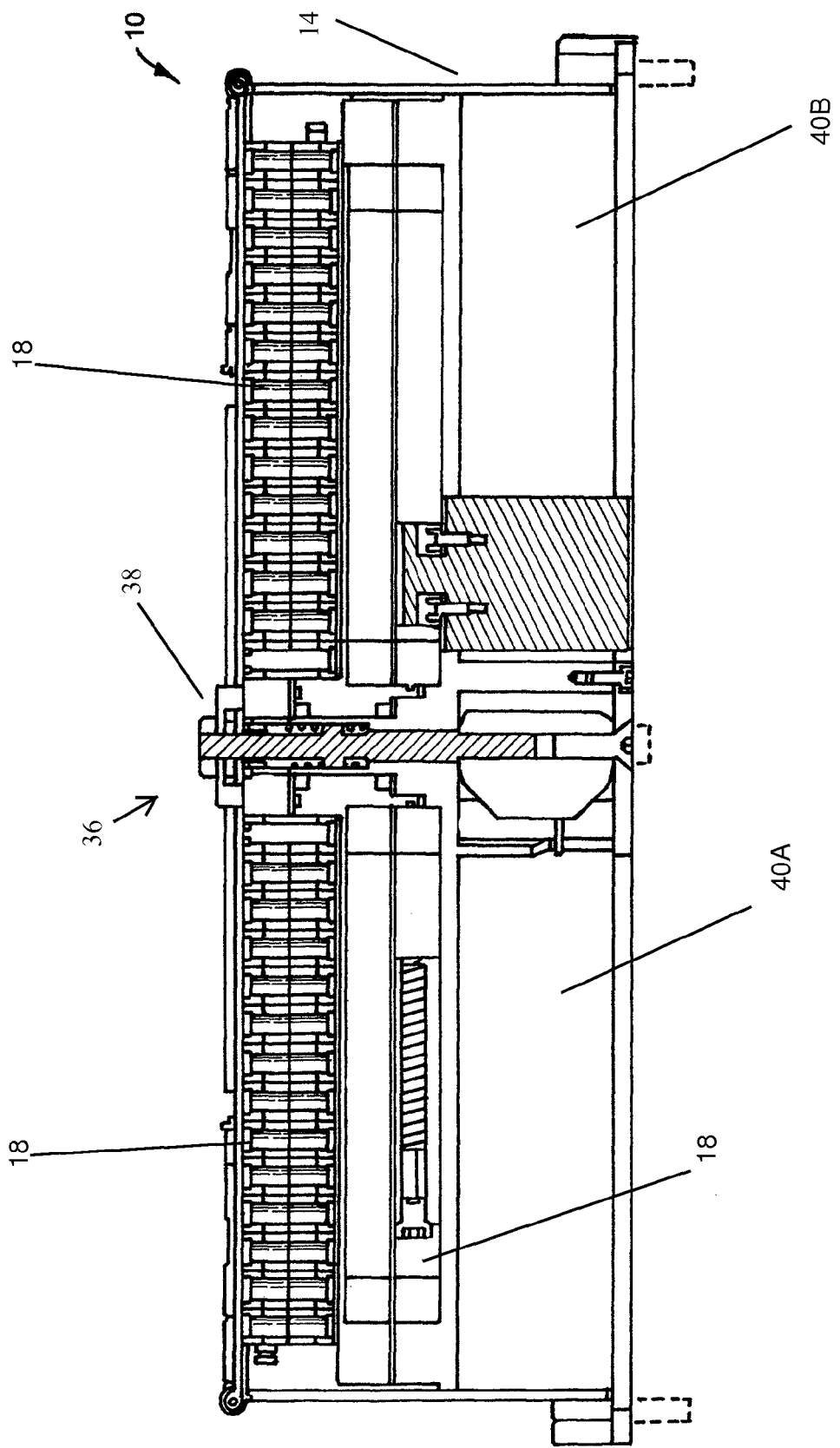
FIG. 11 is a sectional view illustrating the module of the thin membrane structure, constructed in accordance with the present invention.
Figure 12:
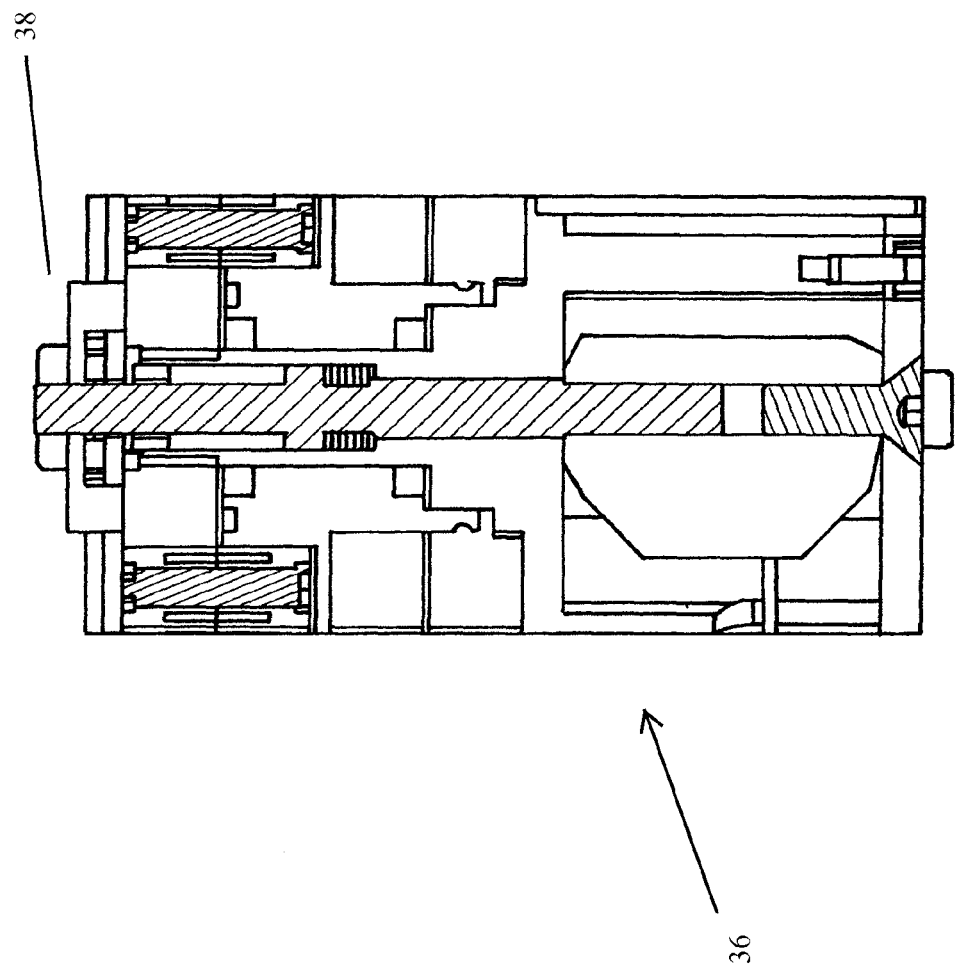
FIG. 12 is a sectional view illustrating a launch restraint of the thin membrane structure, constructed in accordance with the present invention, in a restrained condition.
Figure 13:
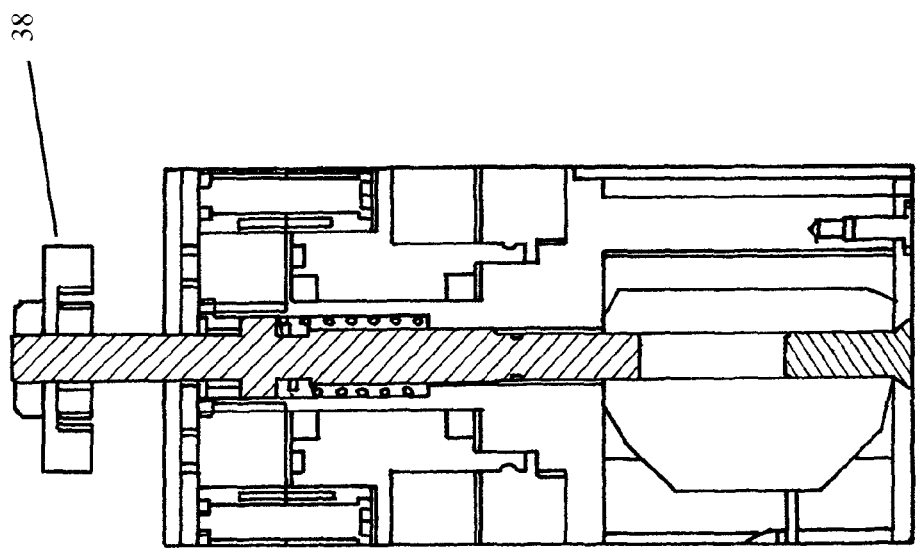
FIG. 13 is a sectional view illustrating the launch restraint of the thin membrane structure, constructed in accordance with the present invention, in a released position.
Figure 14:
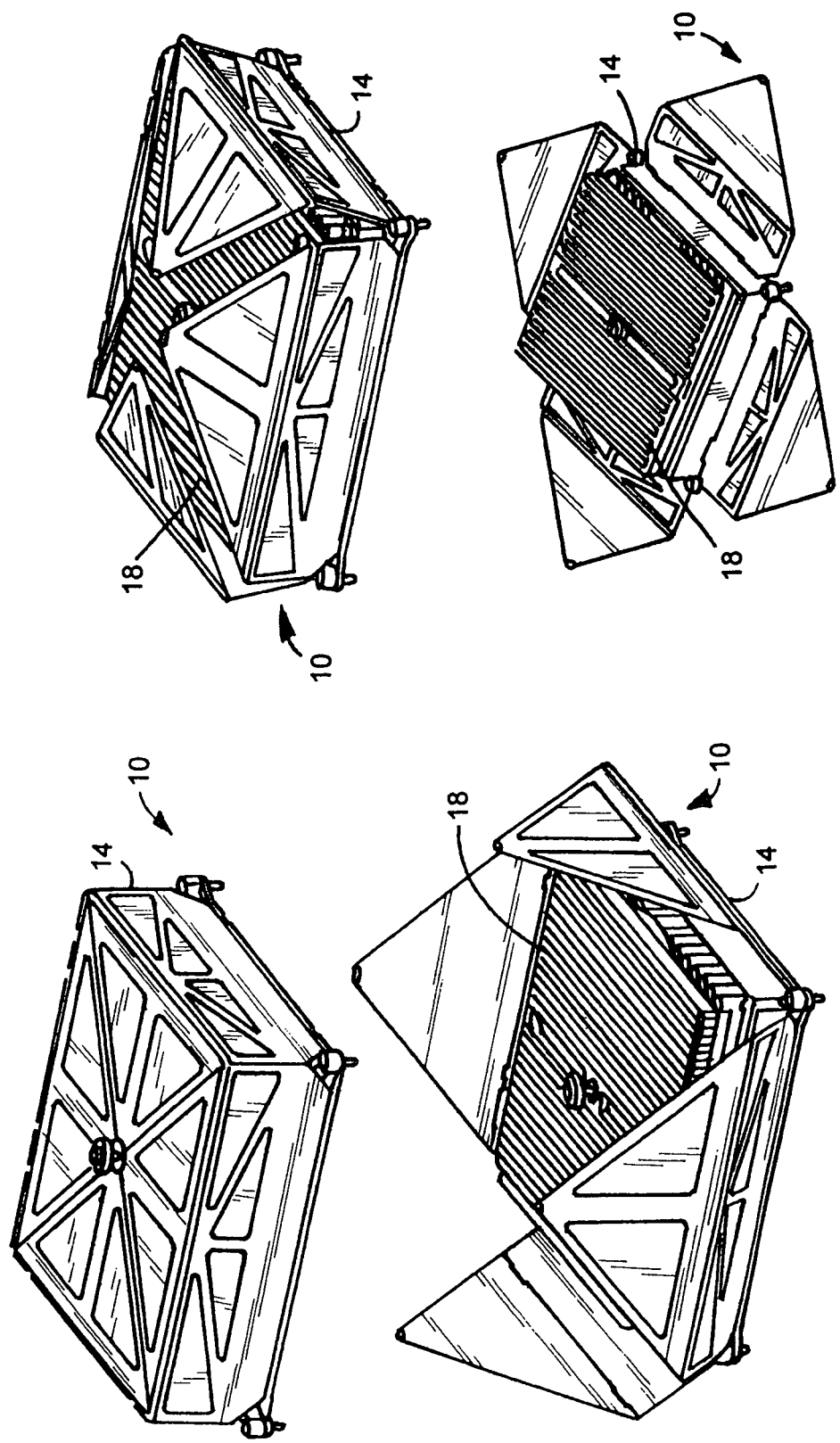
FIG. 14 is a series of perspective views illustrating the launch restraint sequence for deploying the thin membrane structure, constructed in accordance with the present invention.
Figure 15A:
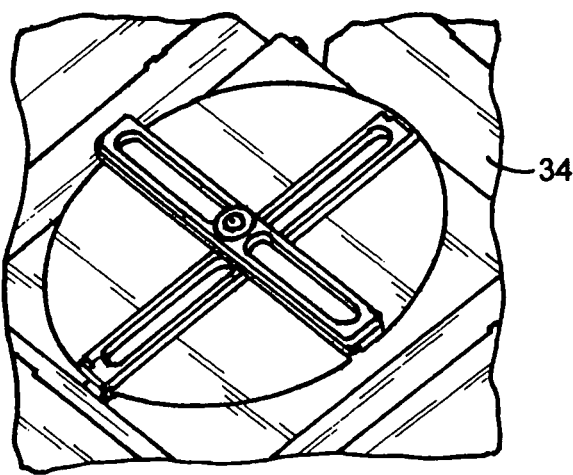
FIGS. 15a and 15b are perspective views illustrating the root pantograph sequencer mechanism for deploying the thin membrane structure, constructed in accordance with the present invention.
Figure 15B:
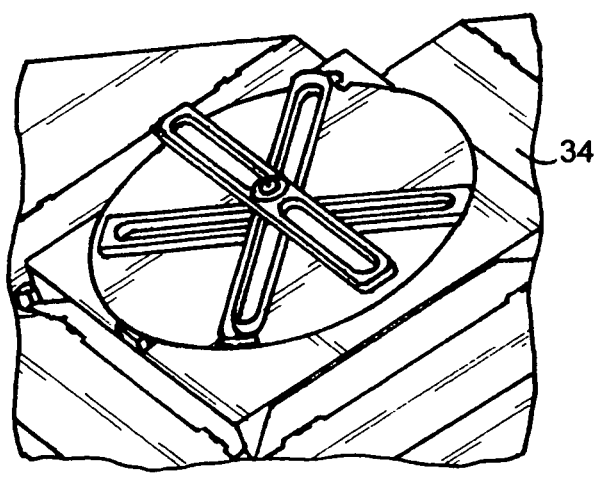

As illustrated in FIGS. 1-16, the present invention is a thin membrane structure, indicated generally at 10, for increasing spacecraft 12 stability that when deployed, increases the distance between the center of gravity and center of pressure thereby increasing the spacecraft 12 stability. The thin membrane structure 10 is preferably stored in a module 14 mounted at an end of the spacecraft 12.

The thin membrane structure 10 of the present invention comprises a plurality of membrane panels 16 secured to an equal number of pantographs 18. Preferably, there are four triangular membrane panels 16 each having a top point 20, a first base point 22, and a second base point 24. The top point 20 preferably has a strengthening layer 26 secured to the membrane panel 16 with a clamp bar 28 and a plurality of fastening mechanisms 29 although securing the strengthening layer 26 to the membrane panel 16 by other means is within the scope of the present invention. Each pantograph extends between adjacent membrane panels 16, each membrane panel being stored in folded condition in a chamber defined by walls 40A, 40B and an outer wall of the module 14.

The first base point 22 and the second base point 24 of the membrane panel 16 of the thin membrane structure 10 of the present invention has a pair of flanges 30 extending therefrom with each flange 30 having a grommet 31 secured therethrough. The flanges 30 are secured to the free end of the pantographs 18 with a pin 32 extending through the grommets thereby securing the first base point 22 of one of the membrane panels 16 adjacent to the second base point 24 of an adjacent membrane panel. As the pantographs 18 expand, they expand the membrane panels 16 creating a pyramidal form with each of the membrane panels 16 forming one of the pyramid sides. It is important to support each membrane panel 16 between adjacent membrane panels 16 along the pyramid sides thereby inhibiting collapse of the pyramidal structure.

Typical deployable structures are flat and not prism shaped thereby positioning the center of pressure right at the front of the spacecraft and fairly close to the center of gravity. The further the center of gravity is from the center of pressure, the greater the spacecraft 12 stability. The pyramidal shape of the thin membrane structure 10 of the present invention positions the center of pressure two-thirds of the depth of the spacecraft structure 12 providing a large increase in distance between the center of pressure and the center of gravity. The center of pressure is moved to a point beyond the top of the spacecraft 12.

Basically, the thin membrane structure 10 of the present invention provides a pyramidal thin membrane or "blanket" structure usable for multiple purposes (i.e., de-orbit, solar sail, solar cell, etc.) that increase spacecraft stability upon deployment due to a formed prism shape. The prism is a four-sided pyramid with a rectangular base and triangular sides. The pyramidal shape of the thin membrane structure 10 moves the center of pressure of the spacecraft 12 away from the center of gravity increasing the stability of a spacecraft 12.

The pantographs 18 of the thin membrane structure 10 of the present invention can be of any style or type. Preferably, the pantographs 18 and the deployment of the pantographs 18 are best illustrated in FIGS. 10-16 together with root sequencer mechanism 34 for easily and efficiently deploying the thin membrane structure 10.

For an example of an application of the thin membrane structure 10 of the present invention, consider a de-orbit deployable structure. These structures are flat once deployed. An embodiment of the present invention is pyramidal in shape creating the center of pressure to shift from the face of the structure to ⅔ of the distance of the depth of the pyramidal shape.

An embodiment of the thin membrane structure 10 of the present invention includes four pantographs 18 or similar self-deploying structure, to be used for deployment and structure of the thin membrane panels 16. Deployment is initiated from a release mechanism 36 that operates to move a switch 38 from a "closed" state in which the switch 38 prevents the lid of the module 14 from opening (see FIGS. 1, 11, 12, and 14) to an "open" state in which the switch 38 allows the lid of the module 14 to open such that the membrane panels 16 can be transitioned from a folded state to an unfolded state with a pyramidal shape (see FIGS. 2 and 14). The thin membrane structure 10 is stowed on top of the deployable structure mechanism. The membrane panels 16 unfurl as the pantographs 18 (or other structure) deploy and takes a pyramidal shape when it is fully deployed.

In an embodiment, the thin membrane structure 10 of the present invention is deployed and supported by a structure that is used for deployment and support once deployed. The membranes and supporting/deploying structure are stowed and preloaded by a launch tie while the spacecraft is launched. Once the membrane panels 16 and supporting/deploying structure is needed per mission requirements, a signal is sent to the launch tie allowing the support structure/deploying mechanism to release and unfurl the membrane panels until a fully deployed structure shaped like a pyramid is completed.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A thin membrane structure capable of being used to stabilize a spacecraft, the thin membrane structure comprising:
   a foldable structure having a plurality of triangular side panels, each triangular side panel having two side edges, a base edge, and first, second, and third corners;
   a deployment mechanism operatively attached to the foldable structure and for transitioning the foldable structure between an undeployed state in which each of the plurality of triangular side panels is folded and a deployed state in which each of the plurality of side panels is unfolded relative to the undeployed state; and
   a module for operatively engaging the remainder of a spacecraft, supporting the deployment mechanism, and supporting the foldable structure;
   wherein the first corner of each of the triangular side panels is operatively connected to the module and connected substantially adjacent to the first corner of each of the other triangular side panels so as to define an apex area;
   wherein the two side edges, between the second corner and the apex area and between the third corner and the apex area, of each of the triangular side panels being substantially unconnected from the two side edges of the other triangular side panels;
   wherein, when the deployment mechanism is used to place the foldable structure into a deployed state, (a) the first, second, and third corners of each of the plurality of side panels, when viewed from the same perspective, occur in a clockwise sequence beginning with the first corner, (b) the second corner of each of triangular side panels is located substantially adjacent to the third corner of one of the other triangular side panels so as to define a plurality of vertex areas, (c) the plurality of vertex areas and the base edges define a polygonal shape, (d) and each of the two side edges of each of the triangular side panels is disposed substantially adjacent to and substantially parallel to a side edge of another one of the triangular side panels to define a pyramid edge that extends between the apex and the polygonal shape, and (e) the plurality of vertex areas, the apex area, the base edges, and the pyramid edges define a pyramidal shape in which the apex area is spaced from a plane defined by the polygonal shape.

2. The thin membrane structure of claim 1 wherein the foldable structure has four triangular side panels.

3. The thin membrane structure of claim 2 and further comprising:
   a strengthening layer secured to each of the triangular side panels adjacent to the first corner.

4. The thin membrane structure of claim 3 wherein the strengthening layer secured to each of the triangular side panels is secured with a clamp bar and a plurality of fastening mechanisms.

5. The thin membrane structure of claim 1 wherein the deployment mechanism includes a plurality of pantographs, each of the pantographs having an attached end operatively attached to the module and a free end capable of being displaced relative to the attached end and operatively connected to a vertex area.

6. The thin membrane structure of claim 5 wherein the deployment mechanism includes:
   a pair of flanges extending from each of the second and third corners of each of the triangular side panels.

7. The thin membrane structure of claim 6 wherein each flange has a grommet secured therethrough, each flange secured to the free end of one of the plurality of pantographs with a pin extending through the grommets thereby securing the second corner of one of the triangular side panels adjacent to the third corner of an immediately adjacent triangular side panel.

8. A thin membrane structure capable of being used to stabilize a spacecraft, the thin membrane structure comprising;
   a foldable structure having a plurality of triangular side panels, each triangular side panel having two side edges, a base edge, and first, second, and third corners;
   a deployment mechanism operatively attached to the foldable structure and for transitioning the foldable structure between an undeployed state in which each of the plurality of triangular side panels is folded and a deployed state in which each of the plurality of side panels is unfolded relative to the undeployed state; and
   a module for operatively engaging the remainder of a spacecraft, supporting the deployment mechanism, and supporting the foldable structure;
   wherein the first corner of each of the triangular side panels is operatively connected to the module and connected substantially adjacent to the first corner of each of the other triangular side panels so as to define an apex area;
   wherein the two side edges of each of the triangular side panels being substantially free from direct attachment to either of the two side edges of the other triangular side panels;
   wherein, when the deployment mechanism is used to place the foldable structure into a deployed state, (a) the first, second, and third corners of each of the plurality of side panels, when viewed from the same perspective, occur in a clockwise sequence beginning with the first corner, (b) the second corner of each of triangular side panels is located substantially adjacent to the third corner of one of the other triangular side panels so as to define a plurality of vertex areas, (c) the plurality of vertex areas and the base edges define a polygonal shape, and (d) the plurality of vertex areas and the apex area define a pyramidal shape in which the apex area is spaced from a plane defined by the polygonal shape;
   wherein the deployment mechanism includes a plurality of pantographs, each of the pantographs having an attached end operatively attached to the module and a free end capable of being displaced relative to the attached end and operatively connected to a vertex area;
   a root sequencer mechanism operatively connected to the plurality of pantographs and capable of causing the free end of each of the plurality of pantographs to move away from the attached end of the related one of the plurality of pantographs.

9. A method capable of being used to stabilize a spacecraft, the method comprising:
   providing a module that is capable of being operatively connected to a spacecraft, the module being in a first state in which the module has an extent, the module supporting a foldable structure that is in a folded state and substantially located within the extent of the module, the foldable structure having an apex area operatively connected to the module and an outer edge that, if the foldable structure is unfolded on a planar surface, has a polygon shape having "x" number of edges;
   placing, following the step of providing, the module in a second state in which the foldable structure can be deployed from the module such that at least a portion of the foldable structure will extend beyond the extent of the module in the first state; and using, following the step of placing, a deployment mechanism to transition the foldable structure from the folded state to an unfolded state with a pyramidal shape in which the outer edge of the foldable structure defines vertex areas of a base of a pyramidal shape and the apex area is spaced from the base, the pyramidal shape having (⅔)× edges due to pairs of edges that define the polygon shape being disposed substantially adjacent and substantially parallel to one another so as to constitute a single edge extending between the apex and the base of a pyramidal shape.

10. The method of claim 9 wherein the foldable structure has four triangular side panels, each side panel having first, second, and third corners, a first side extending between the first and second corners, a second side extending between the first and third corners, and a base side extending between the second and third corners, the first corner of each of the four triangular side panels operatively secured to the module to define a portion of the apex area.

11. The method of claim 10 and further comprising:
a strengthening layer attached to each of the triangular side panels about the top point.

12. The method of claim 10, wherein the step of using a deployment mechanism comprises:
providing a plurality of pantographs with each pantograph having a fixed end operatively attached to the module and a free end that is movable relative to the fixed end and operatively attached to the foldable structure; and
extending each of a plurality of pantographs adjacent to one of a first and second sides of one of the triangular side panels and to one of the first and second sides of another one of the triangular side panels.

13. A method capable of being used to stabilize a spacecraft, the method comprising:
providing a module that is capable of being operatively connected to a spacecraft, the module being in a first state in which the module has an extent, the module supporting a foldable structure that is in a folded state and substantially located within the extent of the module, the foldable structure having an apex area operatively connected to the module and an outer edge that, if the foldable structure is unfolded on a planar surface, has a polygon shape;
placing, following the step of providing, the module in a second state in which the foldable structure can be deployed from the module such that at least a portion of the foldable structure will extend beyond the extent of the module in the first state; and
using, following the step of placing, a deployment mechanism to transition the foldable structure from the folded state to an unfolded state with a pyramidal shape in which the outer edge of the foldable structure defines vertex areas of a base of a pyramidal shape and the apex area is spaced from the base;
wherein the foldable structure has four triangular side panels, each side panel having first, second, and third corners, a first side extending between the first and second corners, a second side extending between the first and third corners, and a base side extending between the second and third corners, the first corner of each of the four triangular side panels operatively secured to the module to define a portion of the apex area;
wherein the step of using a deployment mechanism comprises:
providing a plurality of pantographs with each pantograph having a fixed end operatively attached to the module and a free end that is movable relative to the fixed end and operatively attached to the foldable structure; and
extending each of a plurality of pantographs adjacent to one of a first and second sides of one of the triangular side panels and to one of the first and second sides of another one of the triangular side panels;
wherein the step of extending includes using a root sequencer mechanism that is operatively attached to the plurality of pantographs and adapted to apply an extending force to each of the plurality of pantographs to cause the free end of each of the plurality of pantographs to move away from the fixed end of the related one of the plurality of pantographs.

14. A thin membrane structure capable of being used to stabilize a spacecraft, the thin membrane structure comprising:
a foldable structure having at least three triangular side panels, each triangular side panel having two side edges, a base edge, and first, second, and third corners;
a plurality of pantographs, each of the plurality of pantographs having an attached end operatively connected to the module and a free end capable of being displaced relative to the attached end, the free end having a first location operatively secured to the second corner of one of the triangular side panels and a second location that is separated from the first location operatively secured to the third corner of a different one of the triangular side panels, the first and second locations moving closer to a center line defined by the center pivots of the pantograph as the free end of the pantograph is displaced away from the attached end; and
a module for operatively engaging the remainder of a spacecraft, supporting the plurality of pantographs, and supporting the foldable structure, wherein the module is operatively connected to the attached end of each of the plurality of pantographs;
wherein the first corner of each of the triangular side panels is operatively connected to the module and connected substantially adjacent to the first corner of each of the other triangular side panels so as to define an apex area;
wherein, prior to deployment, the foldable structure and the plurality of pantographs are entirely contained within the module;
wherein, when the deployment mechanism is used to place the foldable structure into a deployed state, (a) the first, second, and third corners of each of the at least three triangular side panels, when viewed from the same perspective, occur in a clockwise sequence beginning with the first corner, (b) the second corner of each of the at least three triangular side panels is disposed substantially adjacent to the third corner of a different one of the at least three triangular side panels due to the displacement of the free end away from the attached end of one of the plurality of pantographs, thereby defining a plurality of vertex areas, (c) the vertex areas and the base edges define a polygonal shape, and (d) the plurality of vertex areas and the apex area defining a pyramidal shape in which the apex area is spaced from the a plane defined by the polygonal shape.

15. The thin membrane structure of claim 14 and further comprising:
a strengthening layer secured to each of the triangular side panels about the first corner; and
a pair of flanges extending from each of the second corner and the third corner of each of the triangular side panels;

wherein each flange has a grommet secured therethrough, each flange secured to the free end of one of the pantographs with a pin extending through the grommets thereby securing the second corner of one of the triangular side panels adjacent to the third corner of an adjacent triangular side panel such that as the pantographs expand, the triangular side panels expand creating the pyramidal shape with each of the triangular side panels forming one side of the pyramidal shape.

16. A thin membrane structure capable of being used to stabilize a spacecraft, the thin membrane structure comprising:

a foldable structure having at least three triangular side panels, each triangular side panel having two side edges, a base edge, and first, second, and third corners;

a plurality of pantographs, each of the plurality of pantographs having an attached end operatively connected to the module and a free end capable of being displaced relative to the attached end and secured to the second corner of one of the triangular side panels and the third corner of a different one of the triangular side panels; and a module for operatively engaging the remainder of a spacecraft, supporting the plurality of pantographs, and supporting the foldable structure, wherein the module is operatively connected to the attached end of each of the plurality of pantographs;

wherein the first corner of each of the triangular side panels is operatively connected to the module and connected substantially adjacent to the first corner of each of the other triangular side panels so as to define an apex area;

wherein, prior to deployment, the foldable structure and the plurality of pantographs are entirely contained within the module;

wherein, when the deployment mechanism is used to place the foldable structure into a deployed state, (a) the first, second, and third corners of each of the plurality of side panels, when viewed from the same perspective, occur in a clockwise sequence beginning with the first corner, (b) the second and third corners of the at least three triangular side panels define a plurality of vertex areas, (c) the vertex areas and the base edges define a polygonal shape, and (d) the plurality of vertex areas and the apex area defining a pyramidal shape in which the apex area is spaced from the a plane defined by the polygonal shape;

a root sequencer mechanism operatively connected to the plurality of pantographs and capable of causing the free end of each of the plurality of pantographs to move away from the attached end of the related one of the plurality of pantographs.

* * * * *